June 3, 1941.  E. S. HALL  2,244,361
GUARD FOR SCREEN DOOR HOOKS
Filed Feb. 25, 1941
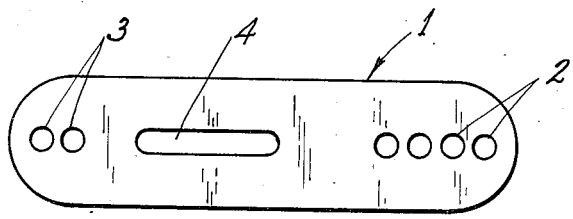
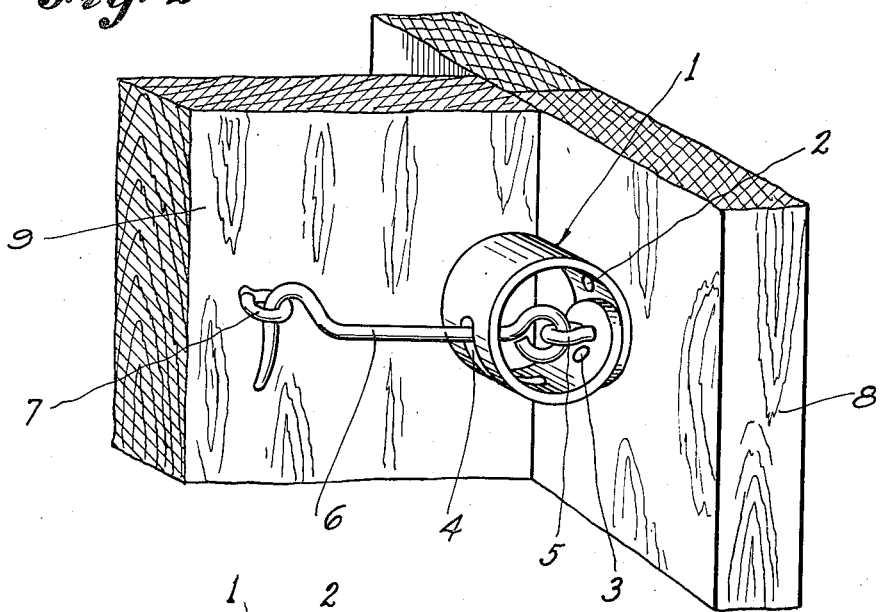
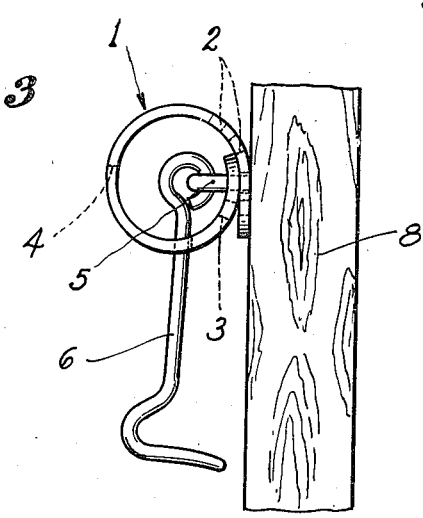
INVENTOR.
Edward S. Hall Patented June 3, 1941

2,244,361

UNITED STATES PATENT OFFICE 2,244,361

GUARD FOR SCREEN DOOR HOOKS

Edward S. Hall, Seattle, Wash.

Application February 25, 1941, Serial No. 380,483

1 Claim. (Cl. 292—95)

The invention is an improved guard for screen door hooks which will control the hook action and permit the door to close properly and will eliminate marring of doors and door casings and prevent tearing of wearing apparel.

The object of the invention is to provide a guard for screen door hooks which will cause the hook portion when released from a hooked position to take a perpendicular position and stay in that position ready for use again, thus preventing any possibility of the hook so hanging as to extend beyond the edge of the door.

Other features and advantages of the invention will appear from the following description, taken in connection with the accompanying drawing wherein:

Figure 1 is a plan view of the guard.
Figure 2 is a perspective view of the guard.
Figure 3 is a side view of the guard.

My invention comprises a flat oblong strip of rubber or other flexible material 1, in the upper end and along the center line of which there is a series of small circular openings 2, in the lower end of which is another series of similar openings 3, with an oblong opening 4 starting from a point just above the middle of the material and continuing toward the lower end thereof, all of such openings being along the center line. In use the ends of the material or guard are curved backward so that the ends thereof overlap, with the upper end of the guard on the outside, and the openings 3 and 2 meet whereupon the threaded shank of a screw eye 5 and the shank of the hook 6 may be thrust thru the oblong opening 4 thence thru the openings 3 and 2 and screwed into the door 8 in the usual manner which makes the guard 1 and the hook 6 ready for use as shown by Figure 3 of the drawing. In Figure 2 the guard 1 and hook 6 are in use with the hook portion of 6 hooked into the eye 7 which is attached to the door casing 9 with the top of the guard opening 4 slightly above the horizontal line of the hook 6. When the hook 6 is disengaged from the eye 7 it automatically is forced to take a downward position by the guard 1 which forces the hook 6 to a perpendicular position with the shank of the hook 6 resting against the bottom of the opening 4 which in turn keeps the point of the hook 6 slightly away from the door 8. The diameter of the cylindrical guard is determined by the position of circular openings 3 and 2 in relation to each other, thus the guard can function properly with hooks of different lengths.

The general idea of the guard is to so enclose the swivel or universal portion of the screen door hook so as to permit its normal function and prevent the hook portion from taking unintended positions extending beyond the door edge, and it is understood that the design of the guard shown is one of several possible designs all of which are contemplated by this specification.

Having thus fully described the invention, what I claim as new and desire to secure by Letters Patent, is:

A guard for screen door hooks comprising a flat strip of rubber or other flexible material which has a series of small circular openings near either end along a center line and which has an oblong opening therein starting from a point near the middle of said strip and continuing toward one end thereof along the center line, the flexibility of said strip permitting it to be formed into a cylindrical guard with one circular opening at each end in alignment and adapted to receive securing means connected to the door hook and with the oblong opening adapted to receive the shank of the door hook, the diameter of the cylindrical guard being adjustable by means of the small circular openings and their relation to each other.

EDWARD S. HALL.